United States Patent [19]

Dunville

[11] 4,178,856

[45] Dec. 18, 1979

[54] WHEEL ASSEMBLY FOR OVERHEAD CONVEYOR

[75] Inventor: Martin Dunville, Dearborn Heights, Mich.

[73] Assignee: Dearborn Fabricating & Engineering Company, Detroit, Mich.

[21] Appl. No.: 921,274

[22] Filed: Jul. 3, 1978

[51] Int. Cl.² .................. B61B 3/00; E01B 25/22; F16C 13/02

[52] U.S. Cl. .................. 104/95; 105/154; 308/16; 308/237 R; 308/DIG. 8

[58] Field of Search .................. 308/16, 17, 18, 92, 308/106, 190, 191, 208, 237 R, DIG. 4, DIG. 5, DIG. 8; 104/95; 105/148, 154; 295/1; 301/5.3, 5.7; 16/97, 107

[56] References Cited

U.S. PATENT DOCUMENTS

| | | | |
|---|---|---|---|
| 1,445,893 | 2/1923 | Krump | 105/154 |
| 1,748,198 | 2/1930 | Van Wormer | 308/237 R |
| 1,816,758 | 7/1931 | Adams | 308/DIG. 5 |
| 2,252,132 | 8/1941 | Mazveskas et al. | 308/191 |
| 2,780,178 | 2/1957 | Zebley | 308/18 |

Primary Examiner—Charles E. Frankfort
Attorney, Agent, or Firm—Cullen, Sloman, Cantor, Grauer, Scott & Rutherford

[57] ABSTRACT

An overhead conveyor includes an I-beam having a web and a pair of side flanges. A pair of opposed interconnected brackets are adapted to support a load, and a trolley wheel assembly is journalled upon each of the brackets and movably mounted upon the I-beam. The wheel assembly comprises a cylindrical shell having an annular shoulder flange at one end and an axial shaft extending from its other end and projected through the upper end of a bracket and secured thereto. A wheel having an axial bore and an internal annular flange has snugly fitted therein a pair of graphite alloy sleeve bearings which bear against the wheel flange, the wheel bearings being loosely disposed upon the shell. The shell flange loosely and retainingly engages one of the bearings and a washer on the shell shaft loosely and retainingly engages the other of the bearings against axial endwise movements respectively.

4 Claims, 3 Drawing Figures

WHEEL ASSEMBLY FOR OVERHEAD CONVEYOR

BACKGROUND OF THE INVENTION

Heretofore, there have been various types of wheel assemblies for overhead trolley conveyors with various mechanisms employed for journalling the wheel assembly upon a pair of opposed interconnected load-carrying upright brackets. Problems have arisen in connection with axial end thrusts against the bearings and in providing a means for journalling the wheel assembly upon the brackets so as to be movably mounted and suspended from an elongated performed I-beam.

Other problems have been involved in utilizing wheel assemblies for overhead conveyors and wherein, the wheel assembly is adapted for transferring a load through an oven involving temperatures up to approximately 400 degrees F., more or less. Various types of ball bearings have been employed for wheel assemblies. Examples of such wheel assemblies may be found in the following U.S. Pat. Nos. 3,268,062, 3,971,601, 2,780,178, 2,262,714, 2,697,010, 3,049,083.

SUMMARY OF THE INVENTION

It is an object of the invention to provide an improved trolley wheel for overhead conveyors with an improved wheel assembly therefore.

It is a further object to provide for such wheel assembly an improved graphite alloy sleeve bearing or bearings which will have an improved long life and which are capable of effective operation in high-temperature areas and which have a minimum amount of wear and consequent replacement or shutdown time.

It is another object to provide an improved wheel assembly wherein, a pair of graphite bronze sleeve bearings are press-fitted within a wheel and arranged upon opposite sides of an internal flange therein for rotation with the wheel and with respect to a central shell. Such wheel assembly includes end thrust means which operatively and retainingly but loosely engage axial end portions of the sleeve bearings without resistance to wheel rotation but, at the same time, are designed to react against axial end thrusts or compression forces.

These and other objects will be seen from the following specification and Claims in conjunction with the appended drawing.

THE DRAWING

DETAILED DESCRIPTION OF THE INVENTION

Figure 1:
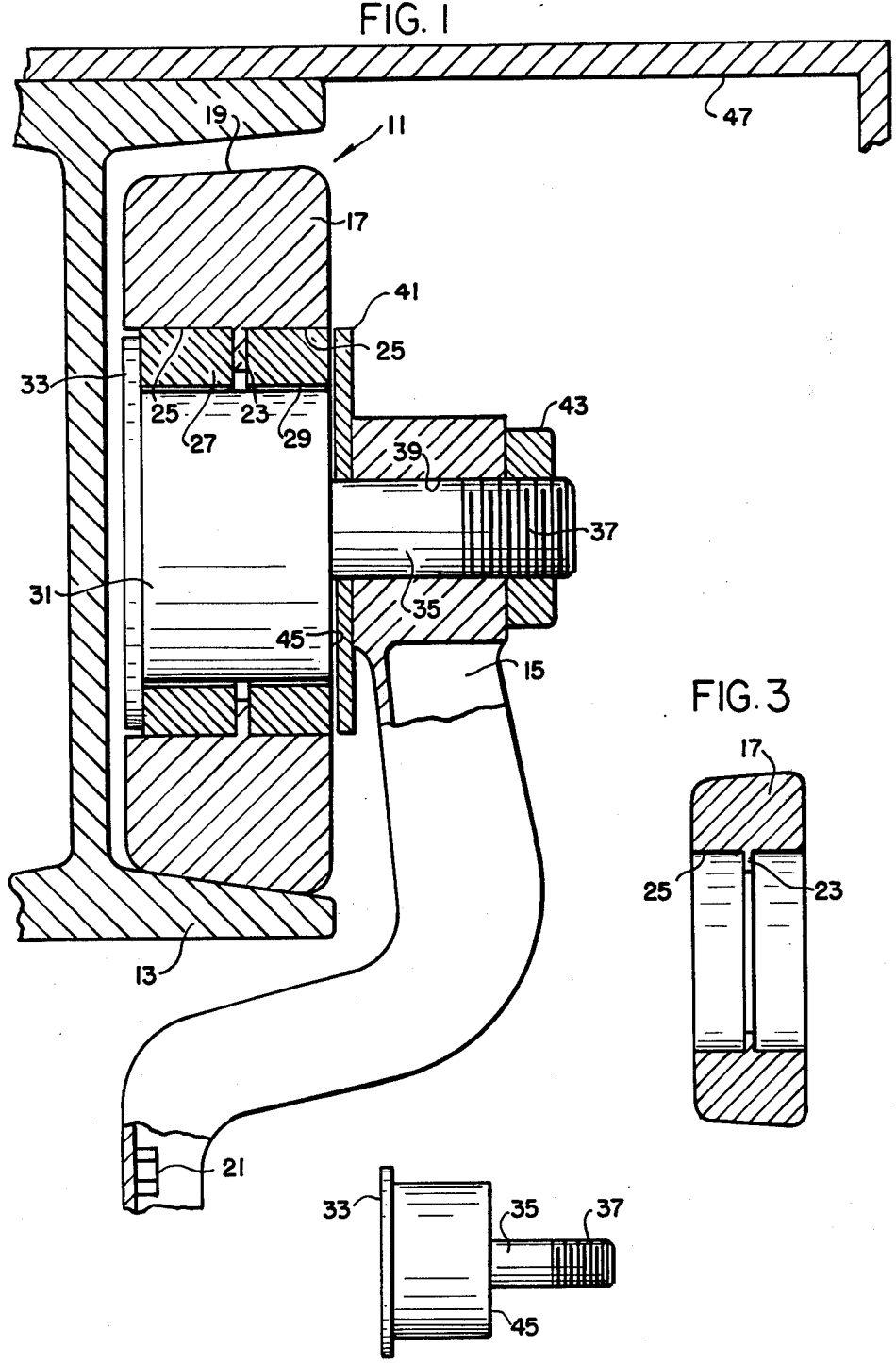
FIG. 1 is a fragmentary vertical section of the present wheel assembly overhead conveyors with the conveyor assembly including an I-beam, a bracket and a portion of a support fragmentarily shown.
Figure 3:
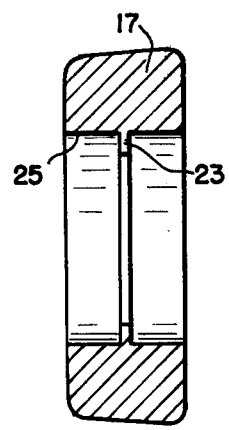
FIG. 3 is a vertical section of the wheel shown in FIG. 1.
Figure 2:
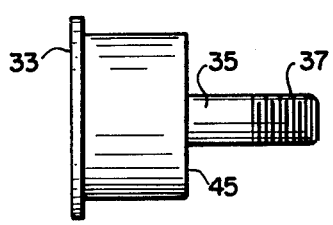
FIG. 2 is a side elevational view of the wheel assembly shell shown in FIG. 1.

Attempts to use graphite bronze bushings on trolley wheels have been unsuccessful because they have approximately one-half the capacity of ball bearing trolley assemblies and further, because of the problems caused by the use of steel washers frictionally engaging the wheel itself for producing unnecessary load and wear.

The present overhead conveyor assembly is generally indicated at 11 and includes an elongated or formed I-beam 13 including an upright web and a pair of opposed side flanges together with a pair of centrally interconnected opposed brackets 15, one of which is fragmentarily shown, with said brackets adapted to movably suspend a load. A trolley wheel assembly includes wheel 17 made of hardened steel or forged which has an exterior tapered surface at 19 and an axial bore 25. An internal annular flange 23 is formed as a part of said wheel and projects into said bore intermediate the ends thereof. A pair of graphite alloy sleeve bearings 27, preferably a graphite bronze alloy, are force-fitted into the wheel bore 25 and bear against opposite sides of wheel flange 23.

Said sleeve bearings have a bore 29, and loosely disposed within said bore is the elongated cylindrical shell 31, preferably of steel and having at one end an annular shoulder flange 33.

Shaft 35 projects axially from the opposite end of said shell, has a threaded portion 37 at one end, and snugly projects through transverse bore 39 at the upper end of the bracket 15. A washer 41, preferably of steel, is interposed between bracket 15 and the shoulder 45 at the adjacent end of said shell.

Said shaft and shell are affixed to the upper end of bracket 15 by fastener 43, such as the lock nut shown in FIG. 1.

In the present construction, the overhead conveyor assembly and the I-beam 13 is supended from a suitable supporting structure, fragmentarily shown at 47, which could be an oven or other support beam.

The present wheel assembly for overhead conveyors may be of the high temperature type and wherein, the load suspended and carried by the brackets 15 is movably transported through the chamber of an oven, wherein the temperatures may go up to 450 degrees F. approximately.

The construction of the present graphite alloy sleeve bearings is such as to withstand such high temperatures and to permit normal operation of the trolley wheel assembly, without destruction due to high heat.

The internal wheel flange 23 is laterally displaced from the center of the wheel 17 within its bore 25 so that the shoulder flange 33 of said shell is disposed within the wheel periphery.

OPERATION

In operation, shoulder flange 33 loosely yet operatively and retainingly engages the adjacent sleeve bearing 27 and retains said bearing and the assembled wheel against endwise movements in one direction.

The corresponding washer 41 interposed between bracket 15 and the shoulder 45 of said shell is adapted to loosely yet retainingly engage the end surface of the other sleeve bearing to restrain said bearing and the associated wheel against endwise axial movements in the opposite direction.

Accordingly, the wheel with the internal graphite bronze bearings therein bearing upon opposite sides of the internal wheel flange 23 is adapted for journalling upon and rotation with respect to the stationary shell 31 affixed to the upper end of each of the brackets 15.

The composition of the present graphite sleeve bearing is in the nature of an alloy which is aproximately 50 percent graphite and 50 percent bronze, for illustration. The proportions of graphite may vary between five and 50 percent.

While the present trolley wheel assembly for overhead conveyors is of general utility for the movable suspension of a load upon and along a typical I-beam, it is contemplated that the present trolley wheel assembly is particularly adapted for high temperature trolleys such as might be employed in transporting panels or other painted objects through a heating and drying oven 47 wherein, the temperatures may reach up to 450 degrees F. more or less.

Having described my invention, reference should now be had to the following Claims.

I claim:

1. In an overhead conveyor including an I-beam having a web and a pair of side flanges, a pair of opposed centrally interconnected brackets adapted to support a load, and a trolley wheel assembly journalled upon each of said brackets and movably mounted upon and along said flanges;

said wheel assembly comprising a cylindrical shell;

an annular shoulder flange at one end of said shell;

an axial shaft of reduced diameter relative to and extending from the other end of said shell, projected through the upper end of a bracket and secured thereto;

A hardened wheel having an axial bore;

an internal annular flange on said wheel intermediate the ends of said bore;

a pair of graphite alloy sleeve bearings press-fitted into said wheel bore and operatively engaging said wheel flange;

said bearings being loosely disposed upon said shell, with said shell flange loosely engaging one of said bearings and retaining said bearing against axial movement in one direction;

and a washer on said shaft between said shell and bracket loosely engaging the other bearing and retaining said bearing against axial movement in the opposite direction; said shell flange and said washer each having a diameter that is less that the diameter of said axial bore, such that said shell flange and said washer engage only said bearings, respectively, said sleeve bearings thus acting as both radial and thrust bearings.

2. In the conveyor wheel assembly of claim 1, said sleeve bearings being a graphite-bronze alloy.

3. In the conveyor wheel assembly of claim 1, said wheel flange being laterally displaced from the center of the wheel, said shell shoulder flange being nested within the wheel periphery.

4. In combination, a pair of interconnected overhead trolley conveyor brackets adapted to suspend a load, and a wheel assembly journalled upon each bracket;

said wheel assembly comprising a cylindrical shell;

an annular shoulder flange at one end of said shell;

an axial shaft of reduced diameter relative to and extending from the other end of said shell, projected through the upper end of a bracket and secured thereto;

a hardened wheel having an axial bore;

an internal annular flange on said wheel intermediate the ends of said bore;

a pair of graphite alloy sleeve bearings press-fitted into said wheel bore and operatively engaging said wheel flange;

said bearings being loosely disposed upon said shell, with said shell flange loosely engaging one of said bearings and retaining said bearing against axial movement in one direction;

and a washer on said shaft between said shell and bracket loosely engaging the other bearing and retaining said bearing against axial movement in the opposite direction; said shell flange and said washer each having a diameter that is less than the diameter of said axial bore, such that said shell flange and said washer engage only said bearings, respectively, said sleeve bearings thus acting as both radial and thrust bearings.

* * * * *